(12) United States Patent
Risley

(10) Patent No.: US 6,469,238 B1
(45) Date of Patent: Oct. 22, 2002

(54) METHOD AND APPARATUS FOR TEACHING RHYTHM

(76) Inventor: Steven George Risley, Box 194, Clio, CA (US) 96106

( * ) Notice: Subject to any disclaimer, the term of this patent is extended or adjusted under 35 U.S.C. 154(b) by 0 days.

(21) Appl. No.: 09/680,919

(22) Filed: Oct. 6, 2000

Related U.S. Application Data

(60) Provisional application No. 60/158,484, filed on Aug. 8, 1999.

(51) Int. Cl.[7] .............................................. G09B 15/00
(52) U.S. Cl. ...................... 84/470 R; 84/476; 84/477 R
(58) Field of Search ............................. 84/470 R, 476, 84/477 R, 478, 477 B

(56) References Cited

U.S. PATENT DOCUMENTS

| | | | | |
|---|---|---|---|---|
| 3,766,683 A | * | 10/1973 | Vennola | 46/17 |
| 3,771,409 A | * | 11/1973 | Ricket | 84/471 |
| 5,902,945 A | * | 5/1999 | Nakano et al. | 84/402 |
| 6,018,117 A | * | 1/2000 | Harrison et al. | 84/470 R |
| 6,111,178 A | * | 8/2000 | Kile et al. | 84/403 |

* cited by examiner

Primary Examiner—Robert E. Nappi
Assistant Examiner—Kim Lockett

(57) ABSTRACT

Rhythm, beat, choreography, and body movement are taught, and a coordination system for rehabilitation provided, using an apparatus having a base, vertical time-indicators, and beat marks. Students or patients clap, or perform similar functions when the teacher notes that a beat marker has been passed. This method and apparatus are general for all time signatures.

26 Claims, 2 Drawing Sheets

METHOD AND APPARATUS FOR TEACHING RHYTHM

This application claims benefit of Provisional No. 60/158,484 filed Aug. 8, 1999.

BACKGROUND OF THE INVENTION

1. Field of the Invention

This invention relates to methods and apparatus to teach rhythm, choreography, hand eye coordination, and coordination of verbiage, in particular this invention relates to methods and apparatus to teach rhythm, music, and choreography, as well as to improve hand-eye-oral coordination and aid in rehabilitation.

2. State of the Art

Currently, teaching rhythm is a challenge. The teacher must now clap or mark beats with, for example, a stick striking a desk or the like. Similarly, the teacher may use various forms of nomenclature on paper or chalk board to represent beats and the overall rhythm. The teacher may also use vocal representations of beats, such as "Mississippi mud" or "tiki-tiki ta ta" in an attempt to show rhythmic patterns. The students may or may not get the basis of what the teacher is trying to do, and may fail to learn the basics of rhythm.

It would be advantageous to have a three-dimensional apparatus that allowed students and the teachers to see an approach to rhythm and musical time, while still keeping the advantages of the auditory or other more conventional visual representations of rhythm now in use.

SUMMARY OF THE INVENTION

This invention provides an apparatus and method for teaching rhythm and beat to students. The apparatus includes a base, vertical time-indicators, and beat marks. The students can clap, or perform similar functions when the teacher notes that a beat marker has been passed. This method and apparatus are general for all time signatures.

In one aspect of this invention is an apparatus for teaching rhythm to students comprising: an elongate base member; a plurality of elongate time-indicating members having a first end and a second end, the first end secured into the base member; and a plurality of marker members removably placable on the elongate time-indicating members.

A second aspect of this invention is a method of teaching rhythm to students comprising: placing a plurality of beat markers on an apparatus comprising; a base member; a plurality of elongate time-indicating members having a first end and a second end, the first end secured into the base member; and a plurality of beat marker members removably placable on the second ends of the elongate time-indicating members; the method further comprising, passing each time-indicating member; and indicating the rhythm of the beat markers as each one is passed.

DETAILED DESCRIPTION OF THE PREFERRED EMBODIMENT

Rhythm, as used herein, is a broad term including all rhythmic movements of the human body, including hand-eye-oral coordination as well as movement in medical rehabilitation.

Figure 1:
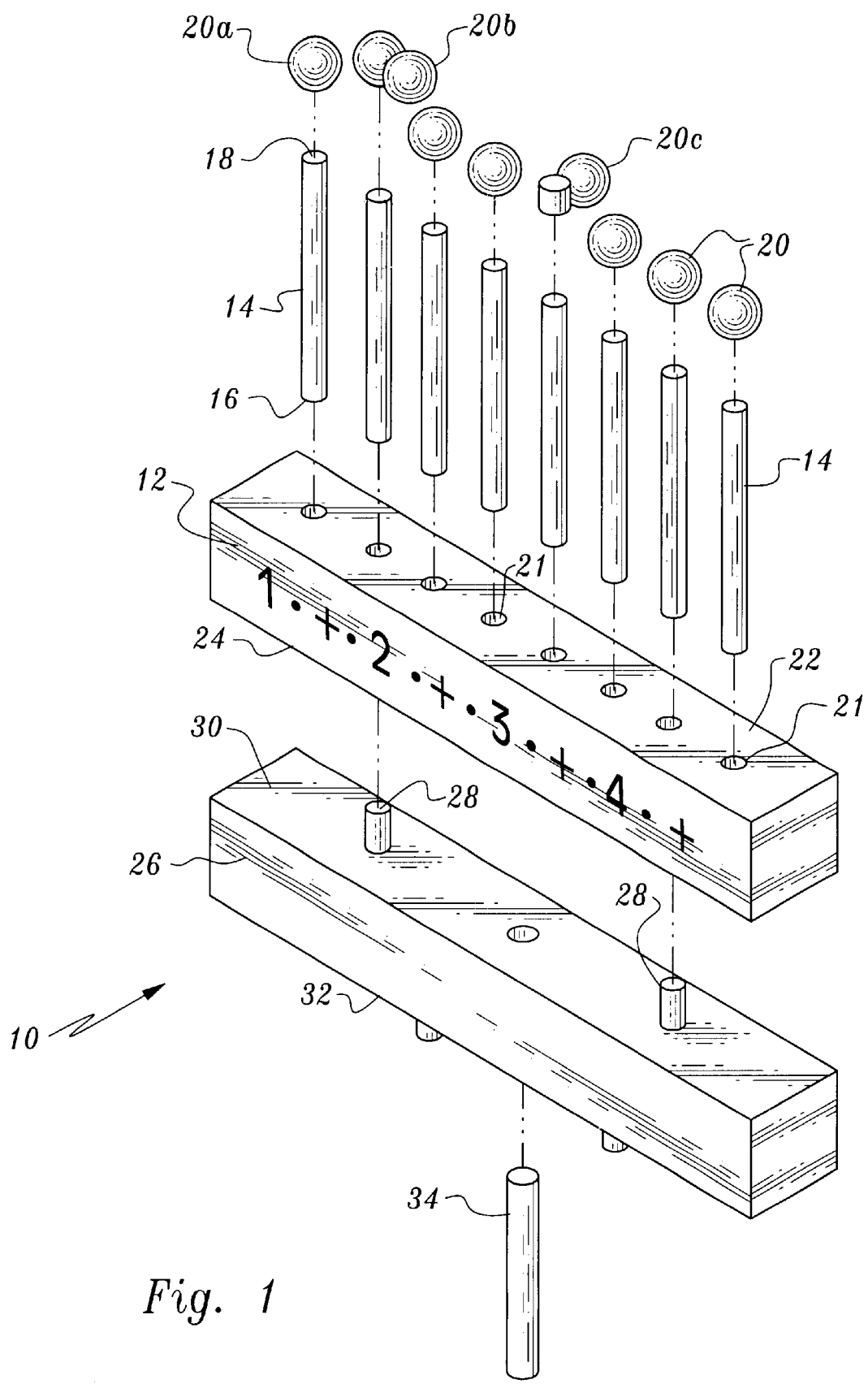
FIG. 1 shows an exploded perspective view of the rhythm teacher of the present invention.

Referring now to FIG. 1 an apparatus for teaching rhythm to students 10 includes an elongate base member 12, a plurality of elongate time-indicating members 14 having a first end 16 and a second end 18, the first end secured into the base member, and a plurality of beat marker members 20 removably placable on the elongate time-indicating members. The time-indicating members may be removable or they may be permanent. If they are removable, they should fit snugly into the base member.

The elongate base member 12 defines a plurality of apertures 21 which are disposed linearly along the length of the base member. The plurality of time-indicating members 14 include elongate members, for example, wooden dowels or the like, snugly fittable into the plurality of apertures in the elongate base member. The elongate base member has a first side 22 (as used herein that will be the up side) and a second side 24 (as used herein that will be the down side). The elongate base member here defines two pluralities of apertures, a first plurality of apertures on the first side (shown in FIG. 1) and a second plurality of apertures (not seen in this view) on the second side. The apparatus for teaching rhythm includes means to attach an adapter block 26 to the second side. The adapter block has two adapter members 28 that fit into two of the apertures on the base member on the downward side of the base member. The adapter block has a first side 30 and a second side 32. The first side is attachable to the elongate base member by use of the adapter members, while the second side of the adapter block defines an aperture suitable to receive a stand 34, for example a cymbal stand or the like. The base member may have two different spacings of holes on its two sides to teach two different time signatures. In that case, the adapter block may have a first side and a second side with different spacings of the adapter members to be received into the two different sides of the base member.

Figure 2:
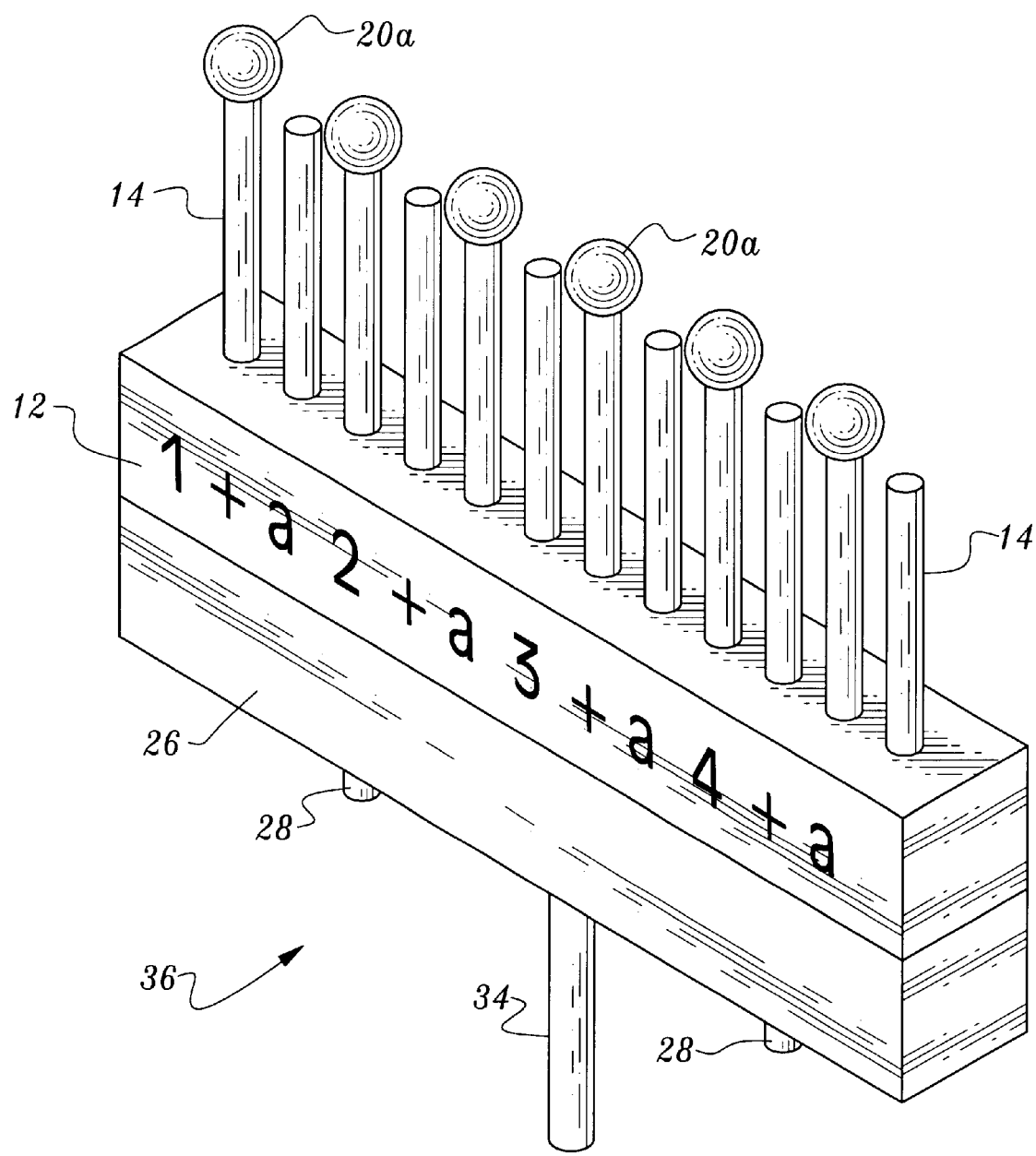
FIG. 2 shows a perspective view of the rhythm teacher of this invention completely assembled and ready for use.

Referring to FIG. 2, the assembled teaching 36 apparatus has the base member 12 and the adapter member 26 securely joined together, and all the time indicating members 14 are in their respective apertures. The adapter is joined to a cymbal stand 34 or the like. Some of the time-indicating members may have beat markers members 20 placed on them. The plurality of beat markers members are placable on the second ends of the time-indicating members. In some embodiments of this invention the plurality of beat markers may be placable along the lengths of the time-indicating members at various heights to indicate pitch or other musical properties. The beat markers may come in a variety of different indicators, each representing a different musical property. The different indicators may be different color, different shape, different size, and the like. For example, in one embodiment the beat marker members are typically colored black, but some are colored red. The red beat marker members can then be used to represent accents in the beat and the like. In another embodiment, a plurality of short beats may be represented by two connected beat markers. These beat marker members can then mark the length of beat.

The base member may also include a beat numbering scheme marked along the base marking at least some of the plurality of time-indicating members. The number of beat marking schemes is large, but popular ones include, 1ea2ea; 1+a2+a; 1de+da2de+da; ta, te–te, tiketike (where the syllables represent quarter notes, eighth notes, and sixteenth notes respectively); 1•2•3•4•5•6•; and any of a number of other widely used systems. The preferred system can use any conventional method to place the characters representing the system on the front surface of the base member; for example, it may be painted, burned, have a decal glued on, or use a magnetic system to stick the notation of the system onto the front surface of the base member.

Usually, western European music is in beats of two, three or four (and variations of six, which is usually really two or three). The system can easily accommodate these systems, but it can also accommodate more unusual schemes such as five (1+2+3+4+5+) or seven (1+2+3+4+5+6+7+) or compound measures (1+a2+, 1+a2+) which are common in Slavic and Indian music. Even more complicated and unusual rhythms can easily be accommodated using the apparatus of this invention.

This invention also provides a method of teaching rhythm, choreography and the like to students. A plurality of beat markers is placed on an apparatus that includes a base member; a plurality of elongate time-indicating members having a first end and a second end, the first end secured into the base member; and a plurality of beat marker members removably placable on the second ends of the elongate time-indicating members. The beat markers are placed on the beat to be played or moved to. The teacher indicates to the students the passing of time by marking the passing of each of the time indicators with a soft clap or the like. When a beat marker is passed the teacher marks some more emphatic movement, for example, stomping a foot or the like. By using beat markers with a variety of different colors, the teacher can have the class do different activities at each beat, for example, clapping hands, stomping feet, tapping a drum with a stick or the like.

In one especially preferred embodiment, the apparatus of this invention includes a base, vertical dowels and beat marker balls. The base is made from a suitable material. Hard woods are especially preferred, although metal and plastics of various sorts can readily be substituted. The base typically selected from a conveniently dimensioned stock, for example, two-by-four commercial stock, and the stock is cut to a convenient length, usually about two feet, or 24 inches, long. All edges are rounded with a router or the like, and equally spaced holes, preferably having diameters of between about 0.25 inches and 0.75 inches, more preferably having diameters of between about 0.375 inches and 0.5 inches, drilled approximately down the longitudinal center line of the cut stock. It is preferable that the holes not penetrate the base member. There may be two sets of holes drilled in the top and bottom surfaces of the base to represent more than one time or rhythm.

Vertical dowels are used as the time indicator means. These dowels, preferably between about 0.25 inches and 0.75 inches in diameter, more preferably between about 0.375 inches and 0.5 inches in diameter, are cut to a convenient length, preferably between about five and 10 inches long, more preferably between six and eight inches long. It is important that the dowels be essentially the same diameters as the holes cut into the base, so they fit snugly yet removably within the base.

Beat marker balls, are preferably spherical balls between about 1 inch and 2.5 inches in diameter, more preferably between about 1.25 inches and 2 inches in diameter, have holes drilled in them, preferably between about 0.25 inches and 0.75 inches in diameter, more. preferably between about 0.375 inches and 0.5 inches in diameter. Again, it is important that the holes in the beat markers be essentially the same diameters as the dowels; however, it is preferred that the fit not be as snug as with the time-indicators and the base members to allow easy and repeated removal and replacement of the beat markers on the dowels.

The apparatus is assembled differently each time it is used, and the assembly depends on the rhythm to be taught. The beat markers are placed on the dowels at specific positions and show students in the class room when to strike, for example, an instrument, perhaps a small drum, the students have already been given by the teacher of the class. The two most common "settings" for this apparatus will be four/four time (ONE, and, two, and, three, and, four, and) or three/four or triplet time (ONE, and, ah, TWO, and, ah, THREE, and, ah, FOUR, and, ah). The apparatus is placed in the front of the class so everyone in the class may see the apparatus easily.

The method to teach rhythm can be used to teach choreography and to use rhythm as a coordination system for medical rehabilitation including sight, verbiage and, body movement.

The beats are taught by doing a series of lessons. The preferred lessons are shown below. In these lessons, the • indicates the position of the beat marker on the ends of the vertical time-indicating means. Some physical action such as clapping or foot stomping might accompany each of these beat markers. While the number of possible sets of lessons are nearly innumerable, one possible set of lessons for four/four time are shown below:

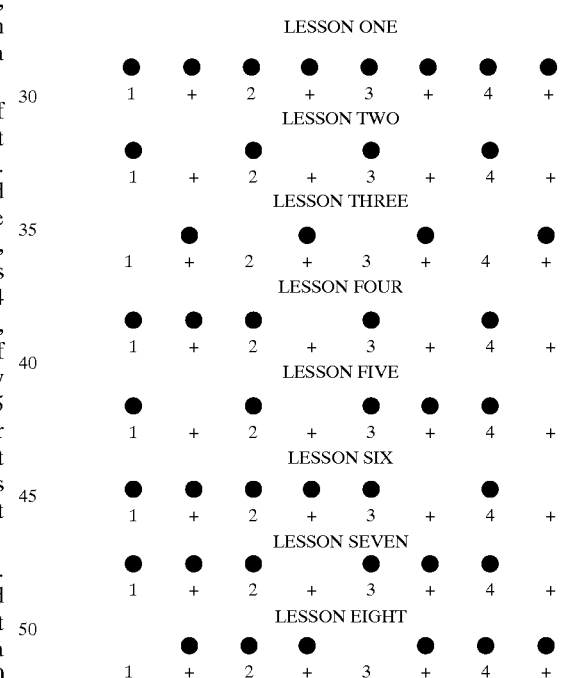

Similarly with three/four time (otherwise referred to as triplet time), a lesson plan could look like this:

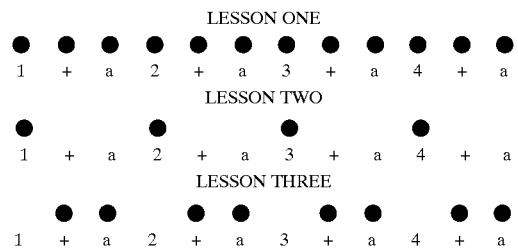

-continued

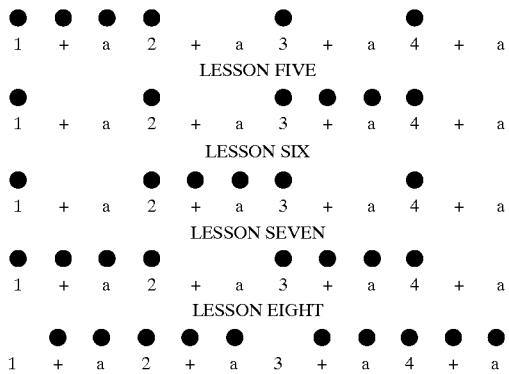

It should be clear that many other lessons teaching different things for different students can easily be devised by the teacher using the apparatus and method of the present invention.

This invention has been described with reference to specific embodiments and examples thereof. Alterations, modifications, and other changes will invariably suggest themselves to those of ordinary skill in the art. It is intended that the scope of the invention be determined solely by reference to the appended claims, and that the appended claims encompass all such alterations, modifications, and changes.

I claim:

1. An apparatus for teaching rhythm comprising:
   an elongate base member including an adapter member having at least one elongate adapter member fitable into the second side of the base member:
   a plurality of elongate vertical dowels having a first and second end, the first end secured to the base member and the second end secured to a marker ball; and
   a plurality of marker members removably placable on the elongate time-indicating members.

2. The apparatus for teaching rhythm of claim 1 wherein the elongate base member defines at least one plurality of apertures disposed linearly along the length of the base member.

3. The apparatus for teaching rhythm of claim 1 wherein the plurality of time-indicating members comprise elongate members fittable into the plurality of apertures in the elongate base member.

4. The apparatus for teaching rhythm of claim 1 wherein the elongate base member has a first side and a second side and the elongate base member defines at least two plurality of apertures, a first plurality of apertures on the first side and a second plurality of apertures on the second side.

5. The apparatus for teaching rhythm of claim 1 wherein the adapter member has a first side and a second side and first side is attachable to the elongate base member and the second side defines an aperture.

6. The apparatus for teaching rhythm of claim 1 wherein the plurality of beat markers are placable on the second ends of the time indicating members.

7. The apparatus for teaching rhythm of claim 1 wherein the plurality of beat markers may be placed along the lengths of the time-indicating members.

8. The apparatus for teaching rhythm of claim 1 wherein the marker members contain different indicia.

9. The apparatus of teaching rhythm of claim 8 wherein the variety of indicators includes indicators of different color.

10. The apparatus for teaching rhythm of claim 9 wherein the variety of indicators includes indicators of different shape.

11. The apparatus for teaching rhythm of claim 9 wherein the variety of indicators includes indicators of different size.

12. The apparatus for teaching rhythm of claim 9 wherein the variety of indicators includes indicators of length of beat.

13. The apparatus for teaching rhythm of claim 1 wherein the base member includes a beat numbering scheme marked along the base marking at least some of the plurality of time-indicating members.

14. The apparatus for teaching rhythm of claim 13 wherein the beat numbering schemes include beats divided into three.

15. The apparatus for teaching rhythm of claim 13 wherein the beat numbering schemes include beats divided into four.

16. The apparatus for teaching rhythm of claim 13 wherein the beat numbering schemes include beats divided into five.

17. The apparatus for teaching rhythm of claim 13 wherein the beat numbering schemes include beats divided into seven.

18. A method of visually teaching rhythm to students comprising:
   placing a plurality of beat markers on an apparatus comprising;
   a base member;
   a plurality of elongate time-indicating members having a first end and a second end, the first end secured into the base member; and
   a plurality of beat marker members removably placable on the second ends of the elongate time-indicating members;
   passing each time-indicating member; and
   indicating the rhythm of the beat markers as each one is passed.

19. The method of visually teaching rhythm of claim 18 wherein the plurality of beat markers are placable on the second ends of the time indicating members.

20. The method of visually teaching rhythm of claim 18 wherein the plurality of beat markers are placable along the lengths of the time-indicating members.

21. The method of visually teaching rhythm of claim 18 wherein the beat markers come in a variety of different indicators.

22. The method of claim 21 wherein the method further includes the step of performing different functions when a different indicator is passed.

23. The, method of claim 22 wherein the different functions include clapping when a different indicator is passed.

24. The method of claim 22 wherein the different functions include hitting an instrument when a different indicator is passed.

25. The method of visually teaching rhythm of claim 18 wherein the rhythm includes choreography.

26. The method of visually teaching rhythm of claim 18 wherein the teaching rhythm includes a coordination system for rehabilitation including sight, verbiage and, body movement.

* * * * *